United States Patent
Huang et al.

(10) Patent No.: US 11,967,832 B2
(45) Date of Patent: Apr. 23, 2024

(54) ALTERNATING CAPACITIVE AND RESISTIVE MODULATION FOR WIRELESS POWER TRANSFER

(71) Applicant: RENESAS ELECTRONICS AMERICA INC., Milpitas, CA (US)

(72) Inventors: Jiangjian Huang, Milpitas (CA); Hulong Zeng, San Jose, CA (US)

(73) Assignee: RENESAS ELECTRONICS AMERICA INC., Milpitas, CA (US)

( * ) Notice: Subject to any disclaimer, the term of this patent is extended or adjusted under 35 U.S.C. 154(b) by 0 days.

(21) Appl. No.: 17/945,474

(22) Filed: Sep. 15, 2022

(65) Prior Publication Data
US 2024/0097493 A1    Mar. 21, 2024

(51) Int. Cl.
*H02J 50/12* (2016.01)
*H02J 50/80* (2016.01)
*H02M 7/219* (2006.01)

(52) U.S. Cl.
CPC .............. *H02J 50/12* (2016.02); *H02J 50/80* (2016.02); *H02M 7/219* (2013.01)

(58) Field of Classification Search
CPC ................................. H02J 50/12; H02J 50/80
See application file for complete search history.

(56) References Cited

U.S. PATENT DOCUMENTS

| | | | |
|---|---|---|---|
| 7,880,588 B2 * | 2/2011 | Enguent | G06K 19/0723 340/572.1 |
| 2017/0018946 A1 * | 1/2017 | Brink | H02J 50/12 |
| 2019/0074867 A1 * | 3/2019 | Park | H02J 50/12 |
| 2019/0089571 A1 * | 3/2019 | Von Novak, III | H04L 1/0003 |
| 2020/0059119 A1 * | 2/2020 | Maniktala | H02J 50/12 |
| 2021/0320745 A1 * | 10/2021 | Kim | H02J 50/402 |

* cited by examiner

*Primary Examiner* — Hal Kaplan
*Assistant Examiner* — Joseph N Inge
(74) *Attorney, Agent, or Firm* — SCULLY, SCOTT, MURPHY & PRESSER, P.C.

(57) ABSTRACT

Systems and methods for wireless power transfer systems are described. A controller of a device can communicate with a power device by a first modulation mode. The controller can detect a failure condition between the controller and the power device. The controller can, in response to the detection of the failure condition, communicate with the power device by a second modulation mode. The first modulation mode can include capacitive modulation and the second modulation mode can include resistive modulation.

20 Claims, 4 Drawing Sheets

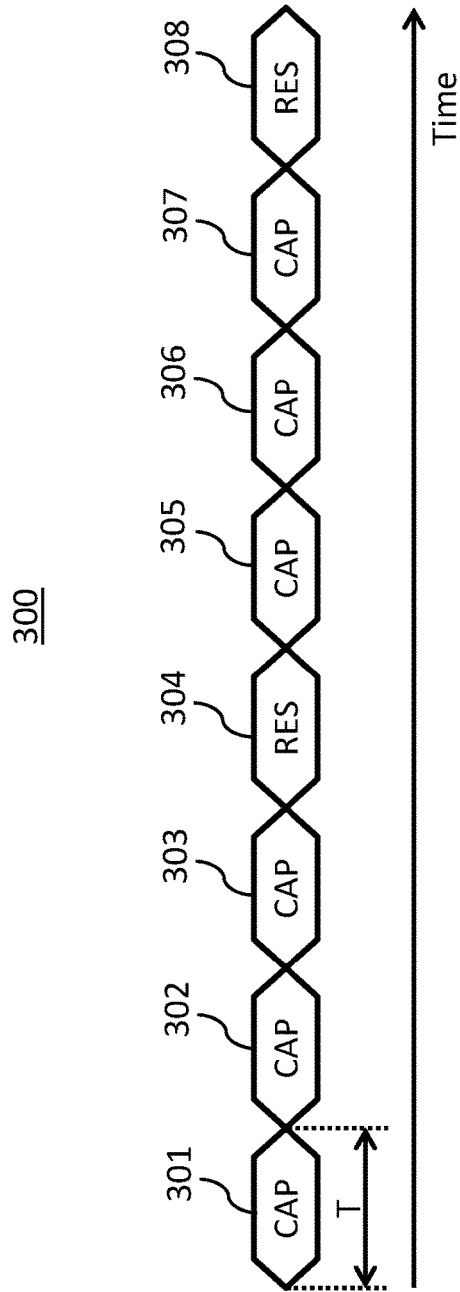
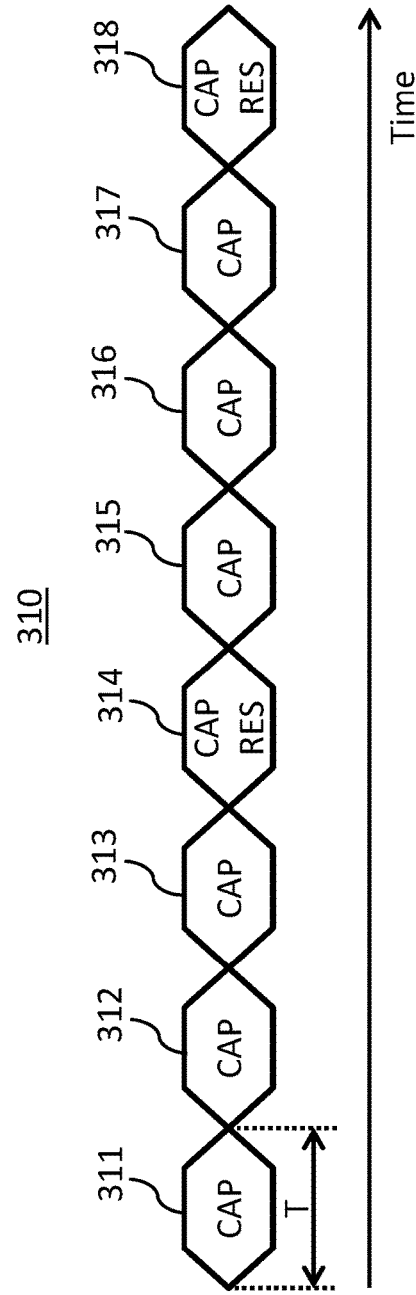

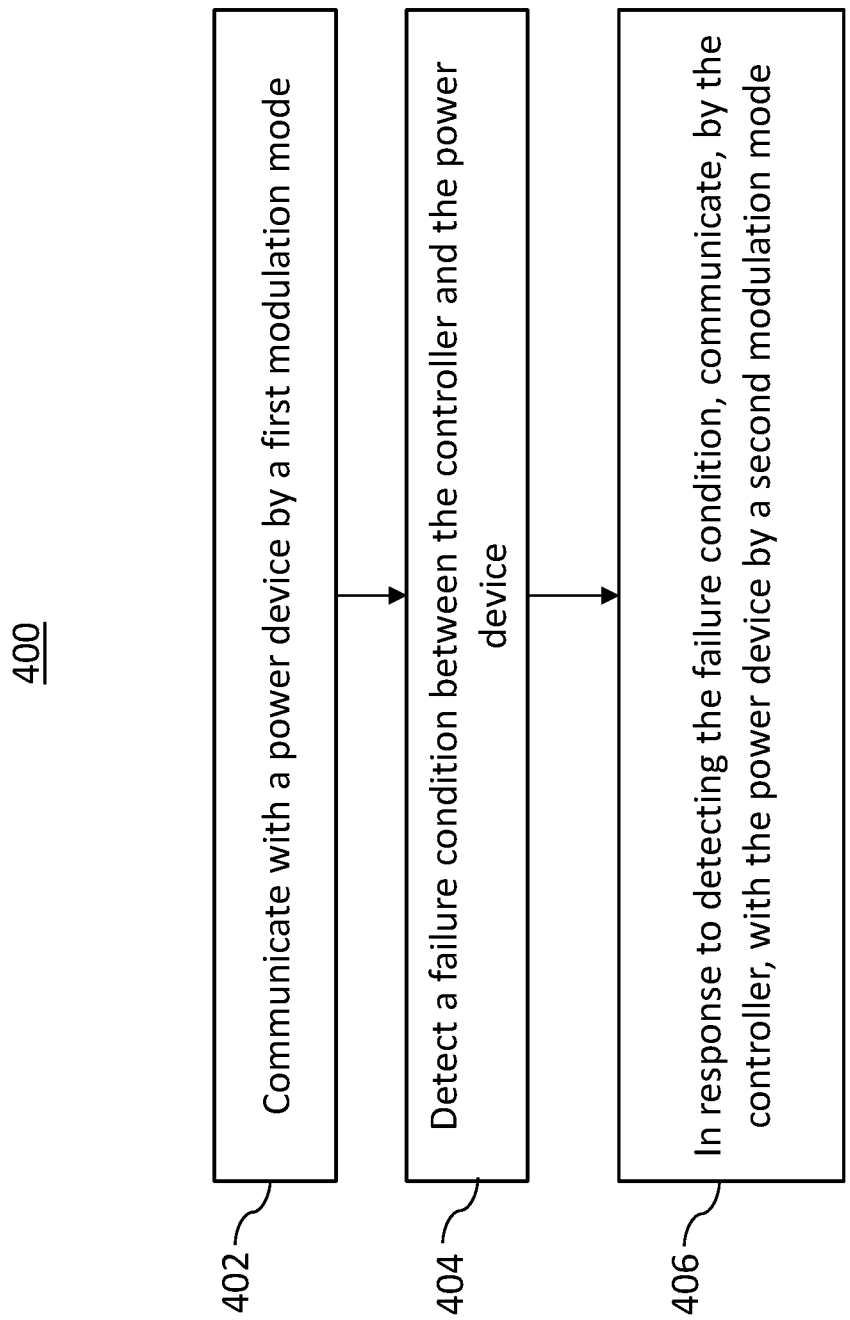

ALTERNATING CAPACITIVE AND RESISTIVE MODULATION FOR WIRELESS POWER TRANSFER

BACKGROUND

The present disclosure relates in general to apparatuses and methods for alternating capacitive and resistive modulation for wireless power transfer between wireless power transmitters and wireless power receivers.

Wireless power systems can include a transmitter having a transmission coil and a receiver having a receiver coil. In an aspect, the transmitter may be connected to a structure including a wireless charging region. In response to a device including the receiver being placed on the charging region, or in proximity to the charging region, the transmission coil and the receiver coil can be inductively coupled with one another to form a transformer that can facilitate inductive transfer of alternating current (AC) power. The transfer of AC power, from the transmitter to the receiver, can facilitate charging of a battery of the device including the receiver.

SUMMARY

In one embodiment, an apparatus is generally described. The apparatus can include a controller configured to communicate with a power device by a first modulation mode. The controller can be further configured to detect a failure condition between the controller and the power device. The controller can be further configured to, in response to the detection of the failure condition, communicate with the power device by a second modulation mode. The first modulation mode can include capacitive modulation and the second modulation mode can include resistive modulation.

In one embodiment, a device is generally described. The device can include a resonant circuit, a power rectifier circuit coupled to the resonant circuit, and a controller coupled to the resonant circuit and the power rectifier circuit. The controller can be configured to communicate with a power device by a first modulation mode. The controller can be further configured to detect a failure condition between the controller and the power device. The controller can be further configured to, in response to the detection of the failure condition, communicate with the power device by a second modulation mode. The first modulation mode can include capacitive modulation and the second modulation mode can include resistive modulation.

In one embodiment, a method for operating a power device is generally described. The method can include communicating, by a controller, with a power device by a first modulation mode. The method can further include detecting, by the controller, a failure condition between the controller and the power device. The method can further include, in response to the detection of the failure condition, communicate, by the controller, with the power device by a second modulation mode. The first modulation mode can include capacitive modulation and the second modulation mode can include resistive modulation.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3A is a diagram showing an example sequence of an implementation of alternating capacitive and resistive modulation for wireless power transfer in one embodiment.

FIG. 3B is a diagram showing another example sequence of an implementation of alternating capacitive and resistive modulation for wireless power transfer in one embodiment.

FIG. 4 is a flow diagram illustrating a process of implementing alternating capacitive and resistive modulation for wireless power transfer in one embodiment.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Wireless power transmitter and wireless power receiver can communicate information relating to power with each other. In some coupling cases, the wireless power transmitter can fail to decode the information sent by the wireless power receiver. The wireless power transmitter can initiate a signal to the wireless power receiver to change the modulation depth or method for better communication quality. However, this method only applies to the case when both the wireless power transmitter and the wireless power receiver come from the same band with dedicated design. For a general wireless power transmitter in the market, this traditional method may not work. Solution that applies to general wireless power transmitter in market may be in demand. Communication quality improvement by a receiver that applicable to general transmitter in market is proposed.

Figure 1:
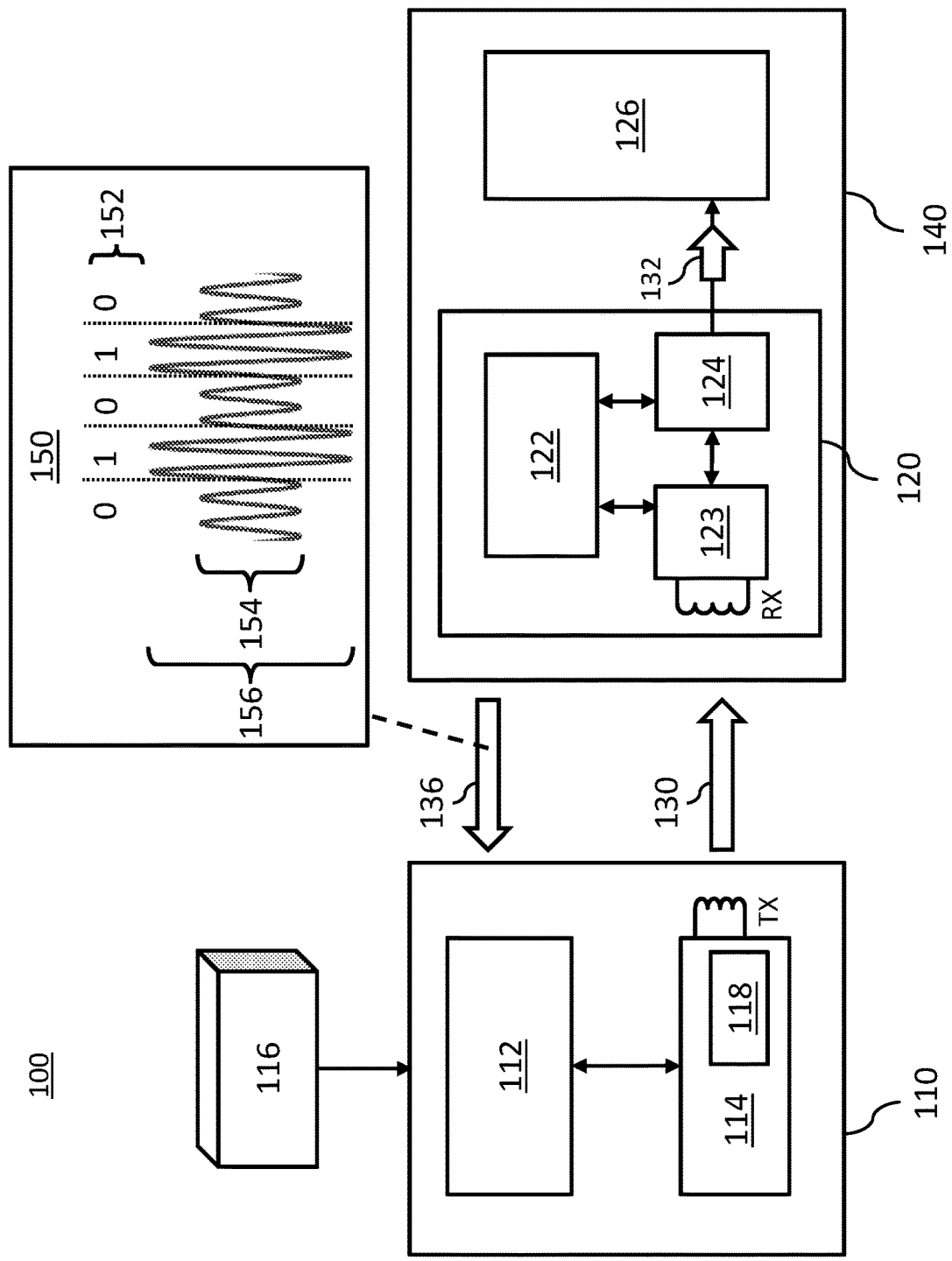
FIG. 1 is a diagram showing an example system that can implement alternating capacitive and resistive modulation for wireless power transfer in one embodiment.

FIG. 1 is a diagram showing an example system that can implement alternating capacitive and resistive modulation for wireless power transfer in one embodiment. System 100 can include power devices, such as a transmitter 110 and a receiver 120, that are configured to wirelessly transfer power and data therebetween via inductive coupling. While described herein as transmitter 110 and receiver 120, each of transmitter 110 and receiver 120 may be configured to both transmit and receive power or data therebetween via inductive coupling. Transmitter 110 can be referred to as a wireless power transmitter and receiver 120 can be referred to as a wireless power receiver.

Transmitter 110 is configured to receive power from one or more power supplies and to transmit AC power 130 to receiver 120 wirelessly. For example, transmitter 110 may be configured for connection to a power supply 116 such as, e.g., an adapter or a DC power supply. Transmitter 110 can include a controller 112 and a power driver 114.

Controller 112 can be configured to control and operate power driver 114. Controller 112 can include, for example, a processor, central processing unit (CPU), field-programmable gate array (FPGA) or any other circuitry that is configured to control and operate power driver 114. While described as a CPU in illustrative embodiments, controller 112 is not limited to a CPU in these embodiments and may comprise any other circuitry that is configured to control and operate power driver 114. In an example embodiment, controller 112 can be configured to control power driver 114 to drive a coil TX of the power driver 114 to produce a magnetic field. Power driver 114 can be configured to drive coil TX at a range of frequencies and configurations defined by wireless power standards, such as, e.g., the Wireless Power Consortium (Qi) standard, the Power Matters Alliance (PMA) standard, the Alliance for Wireless Power (A for WP, or Rezence) standard or any other wireless power standards.

Receiver 120 can be configured to receive AC power 130 transmitted from transmitter 110 and to supply the power to one or more loads 126 or other components of a destination device 140. Load 126 may comprise, for example, a battery charger that is configured to charge a battery of the destination device 140, a DC-DC converter that is configured to supply power to a processor, a display, or other electronic components of the destination device 140, or any other load of the destination device 140. Destination device 140 may comprise, for example, a computing device, mobile device, mobile telephone, smart device, tablet, wearable device or any other electronic device that is configured to receive power wirelessly. In an illustrative embodiment, destination device 140 can include receiver 120. In other embodiments, receiver 120 may be separate from destination device 140 and connected to destination device 140 via a wire or other component that is configured to provide power to destination device 140.

Receiver 120 can include a controller 122, a resonant circuit 123, and a power rectifier 124. Controller 122 can include, for example, a digital controller such as a microcontroller, a processor, CPU, FPGA or any other circuitry that may be configured to control and operate power rectifier 124. Controller 122 can also be configured to control other components of receiver 120, and can control receiver 120 to communicate with transmitter 110 by one or more modulation modes (described below). Resonant circuit 123 can include a coil RX and one or more capacitors, inductors, resistors, that can form circuitry for outputting communication packets 136 and conveying AC power 130, received from transmitter 110, to power rectifier 124. Power rectifier 124 can include rectifier circuits such as half-bridge rectifiers, full bridge rectifiers, or other types of rectifier circuits that can be configured to rectify power received via resonant coil RX of resonant circuit 123 into a power type as needed for load 126. Power rectifier 124 is configured to rectify AC power 130 into DC power 132 which may then be supplied to load 126. Controller 122 can be configured to execute application specific programs and/or firmware to control and operate various components, such as resonant circuit 123 and power rectifier 124, of receiver 120.

As an example, when receiver 120 is placed in proximity to transmitter 110, the magnetic field produced by coil TX of power driver 114 induces a current in coil RX of resonant circuit 123. The induced current causes AC power 130 to be inductively transmitted from power driver 114 to power rectifier 124, via resonant circuit 123. Power rectifier 124 receives AC power 130 and converts AC power 130 into DC power 132. DC power 132 is then provided by power rectifier 124 to load 126.

Transmitter 110 and receiver 120 are also configured to exchange information or data, e.g., messages, via the inductive coupling of power driver 114 and resonant circuit 123. For example, before transmitter 110 begins transferring power to receiver 120, a power contract may be agreed upon and created between receiver 120 and transmitter 110. For example, receiver 120 may send communication packets 136 or other data to transmitter 110 that indicate power transfer information such as, e.g., an amount of power to be transferred to receiver 120, commands to increase, decrease, or maintain a power level of AC power 130, commands to stop a power transfer, or other power transfer information. In another example, in response to receiver 120 being brought in proximity to transmitter 110, e.g., close enough such that a transformer may be formed by coil TX and coil RX to allow power transfer, receiver 120 may be configured to initiate communication by sending a signal to transmitter 110 that requests a power transfer. In such a case, transmitter 110 may respond to the request by receiver 120 by establishing the power contract or beginning power transfer to receiver 120, e.g., if the power contract is already in place. Transmitter 110 and receiver 120 may transmit and receive communication packets 136, data or other information via the inductive coupling of coil TX and coil RX. In some embodiments, communication between transmitter 110 and receiver 120 can occur before power transfer stage using various protocols such as near field communication (NFC), Bluetooth, etc.

In one embodiment, communication packets 136 can include amplitude shift key (ASK) signals encoding one or more messages being conveyed from receiver 120 to transmitter 110. An ASK signal can be an amplitude modulated signal that represents digital data using variations in the amplitude of a carrier wave. Receiver 120 can perform capacitive modulation and/or resistive modulation to generate ASK signals. Capacitive modulation can include switching in or switching out different number of capacitors of a resonant circuit (e.g., resonant circuit 123) to generate the ASK signals and encode messages in the ASK signals. Resistive modulation can include the wireless power receiver switching in or switching out different number of resistors of the resonant circuit to generate the ASK signals. Capacitive modulation can provide relatively less power loss and can filter ripples. Resistive modulation can produce relatively less waveform distortion. Capacitive modulation and resistive modulation can change an impedance of the wireless power receiver. The impedance changes can generate different amplitudes of a signal. Binary representations, such as binary 0 or binary 1, can be encoded in the different amplitudes, hence encoding a message in an ASK signal. Receiver 120 can transmit the ASK signals encoding the messages to transmitter 110.

Transmitter 110 can be configured to decode the messages from the ASK signals received from receiver 120. In an aspect, some problems may arise as transmitter 110 attempts to decode the ASK signals received from receiver 120. Such problems can include, for example, a failure to demodulate the ASK signals due to demodulation quality issues. An example of demodulation quality issue can be, for example, undetectable differences between the different amplitudes among the received ASK signals. For example, a difference between amplitudes in an ASK signal may be undetectable if the difference between the amplitudes may be too small to be distinguishable from one another. In some examples, noise added to the ASK signal during the transmission of the ASK signal may alter the amplitudes of the ASK signal and may reduce the difference between the amplitudes as well. In another example, the distortion level of the ASK signal may be significant to the point where the waveform of the ASK signal deviates from a square waveform too much, making it difficult to be decoded.

In response to a failure to demodulate ASK signals, transmitter 110 may perform measures to resolve the demodulation failure, such as modifying the received ASK signals to amplify the amplitude differences among the ASK signals, or stopping transfer of power to receiver 120. For example, transmitter 110 may add a disturbance (e.g., apply specific or additional voltage or current) to one of an input voltage, a working frequency, or a duty cycle of transmitter 110. However, receiver 120 may not be aware of the measures performed by transmitter 110 and may continue to transmit other ASK signals having the same undesired demodulation quality in future instances. In another example, transmitter 110 can be configured to send notifications of failure conditions, such as demodulation failure or not receiving the ASK signals, to receiver 120. Transmitter 110 can send such notifications as, for example, frequency shift key (FSK) signals and these notifications can include requests to resend specific packets and/or requests to switch modulation schemes.

In an example shown in FIG. 1, receiver 120 can generate an ASK signal 150 to encode a message 152 (e.g., bit stream of 01010) using ASK modulation (e.g., capacitive or resistive modulation). Message 152 may specify power transfer information such as, for example, an amount of power to be transferred to receiver 120, commands to increase, decrease, or maintain a power level of the AC power 130, commands to stop a power transfer, etc. Receiver 120 can transmit ASK signal 150 to the transmitter 110. ASK signal 150 may be a carrier wave having a variable amplitude that varies between an amplitude 154 and an amplitude 156, while being maintained at a fixed frequency. Amplitude 154 may represent or encode the binary value of 0, and the amplitude 156 may represent or encode the binary value of 1. The binary values being encoded in the different amplitudes can be arbitrary. For example, as an alternative, amplitude 154 can encode the binary value of 1 and amplitude 156 can encode the binary value of 0. Receiver 120 can transmit ASK signal 150 to transmitter 110 using inductive transmission from the coil RX to the coil TX.

Controller 112 of transmitter 110 can receive ASK signal 150 and demodulate ASK signal 150 in order to decode message 152 from ASK signal 150. For example, controller 112 may be configured to detect amplitude differences among the ASK signal 150, and may measure the different amplitude values of the ASK signal 150. Controller 112 can be configured to assign different measured amplitudes to different binary values to decode the message 152. For example, the controller 112 may measure the amplitude 154 and assign segments of the ASK signal 150 having the amplitude 154 to binary 0, and may measure the amplitude 156 and assign segments of the ASK signal 150 having the amplitude 156 to binary 1. Although the ASK signal 150 shown in the example of FIG. 1 has two different amplitudes, the ASK signals being generate and transmitted by the receiver 120 may be carrier waves using two or more different amplitudes to encode messages.

Communication packets 136 can be, for example, control error packets (CEPs), received power packets (RPPs), or other packets that can be transmitted from receiver 120 to transmitter 110. In one embodiment, communication packet 136 can be a control error packet (CEP) that includes an ASK signal encoding a message for requesting a specific amount, or power level, of AC power 130. Controller 112 of transmitter 110 can decode the ASK signal to determine whether to maintain, increase, or decrease AC power 130 being provided from power driver 114 to receiver 120. If transmitter 110 fails to demodulate or decode the ASK signal, then AC power 130 being provided to receiver 120 may have a power level that is inconsistent with the power level being requested in the CEP outputted by receiver 120. For example, if receiver 120 requested an increase of power level in the CEP, but transmitter 110 continues maintains the same power level of AC power 130, then controller 122 of receiver 120 can determine that there may be a failure at transmitter 110 to demodulate the CEP.

In one embodiment, receiver 120 shown in FIG. 1 can be configured to switch between capacitive modulation and resistive modulation based on specific conditions of system 100. For example, controller 122 of receiver 120 can be configured to operate receiver 120 (and/or power rectifier 124) under at least a first modulation mode and a second modulation mode. The first modulation mode can be capacitive modulation, and the second modulation mode can be one of: 1) resistive modulation, and 2) an overlap mode that includes a combination of capacitive modulation and resistive modulation.

In one embodiment, controller 122 can operate power rectifier 124 under the first modulation mode to encode messages in signals (e.g., communication packets 136) being outputted from coil RX of resonant circuit 123. In one embodiment, the first modulation mode can be a default modulation mode, and can be capacitive modulation mode. Controller 122 can be configured to detect a failure condition associated with transmitter 110 and/or receiver 120. For example, controller 122 can detect a failure condition associated with system 100, such as failures relating to communication packets 136, receiver 120, and/or transmitter 110. Failure conditions that can be detectable by controller 122 can include, for example, a significant change in deadtime (e.g., an increase from a nanosecond range to microsecond range), frequency shift from optimized point to other points, output current changed from relatively heavy load to lighter load or some unexpected range, a change in a rectifier voltage and an rectifier power, transmitter 110 being non-responsive to non-zero CEPs, unexpected response from transmitter 110 in response to a zero CEP, no FSK response from transmitter 110 when proprietary packets are sent from receiver 120, and/or other types of failure conditions. In one embodiment, detection of the failure condition can include receiver 120 receiving a notification (e.g., a FSK signal) requesting to resend specific packets and/or to switch modulation modes.

In one embodiment, controller 122 can detect an unexpected response from transmitter 110 by detecting that a power level of AC power 130 is inconsistent with a power level requested by receiver 120. For example, if receiver 120 sends a zero CEP, then the power level of AC power 130 is expected to remain unchanged. If the power level of AC power 130 changes in response to the zero CEP, then controller 122 can determine that there may be a potential demodulation failure at transmitter 110, or the zero CEP was not received by transmitter 110.

In one embodiment, controller 122 can detect different types of failure conditions based on an operating condition of receiver 120. For example, controller 122 can monitor CEP packets to detect failure conditions associated with the CEP packets when receiver 120 is operating under steady state. Controller 122 can monitor signal strength, and/or identification (ID) and configuration packets to detect the failure condition when receiver 120 is in a start-up stage.

In response to the detection of the failure condition, controller 122 can switch modulation mode by operating power rectifier 124 under the second modulation mode to encode messages in signals (e.g., communication packets 136) being outputted from coil RX of resonant circuit 123. The switching from the first modulation mode to the second modulation mode can allow receiver 120 to encode messages using a different modulation mode.

Figure 2:
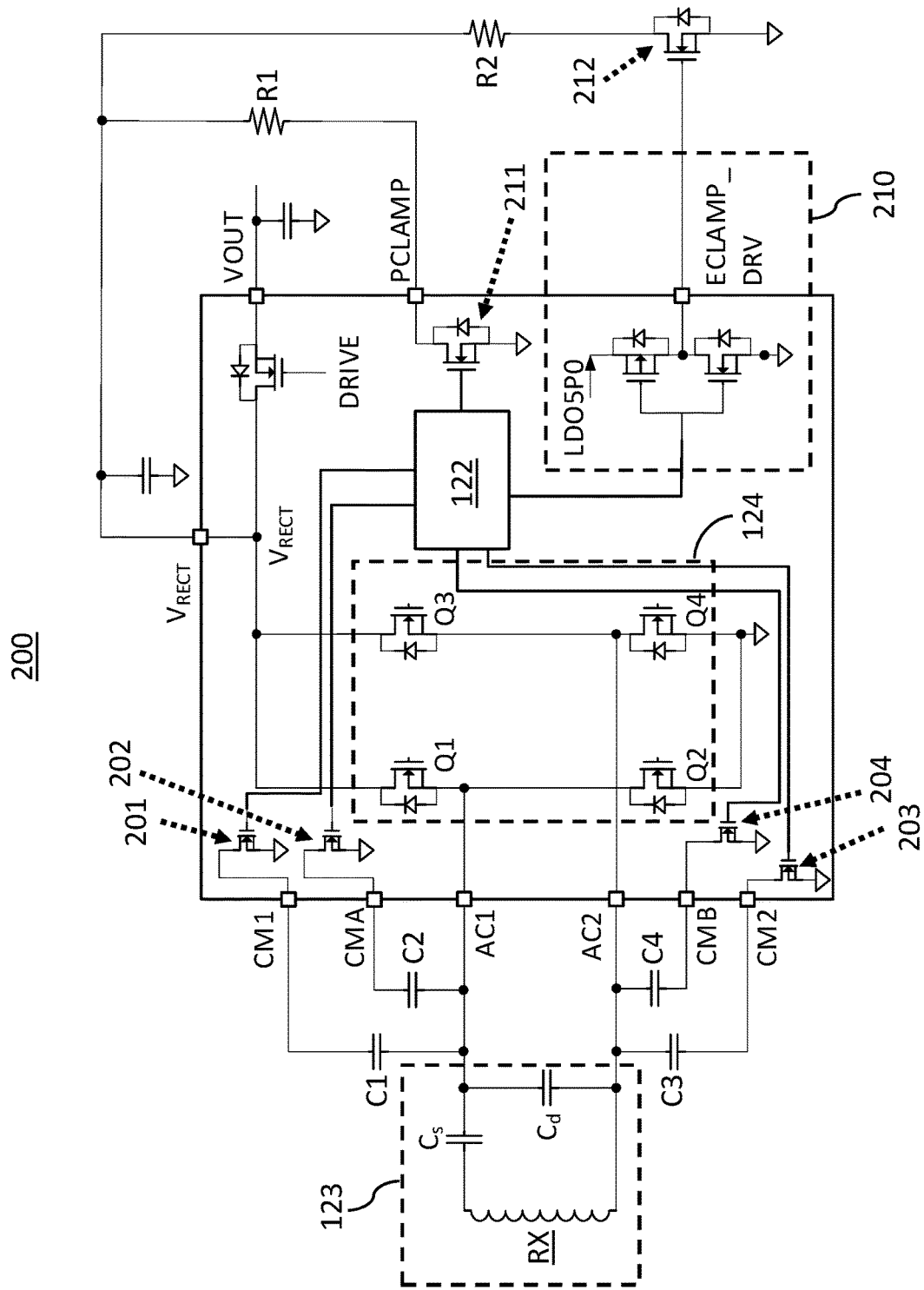
FIG. 2 is a diagram showing a circuit that can implement alternating capacitive and resistive modulation for wireless power transfer in one embodiment.

FIG. 2 is a diagram showing a circuit 200 that can implement alternating capacitive and resistive modulation for wireless power transfer in one embodiment. Circuit 200 shown in FIG. 2 can be housed inside receiver 120 shown in FIG. 1. Circuit 200 can include at least controller 122, resonant circuit 123, and power rectifier 124. Power rectifier 124 can include a plurality of switches, such as field-effect transistors (FETs) arranged in a full bridge configuration. Power rectifier 124 can include high side FETs Q1 and Q3, and low side FETs Q2 and Q4. High side FETs Q1, Q3 and low side FETs Q2, Q4 can be operated by, for example, controller 122 to convert AC power 130 (see FIG. 1) being received by coil RX into DC power 132 (see FIG. 1).

To perform capacitive modulation, controller 122 can control switches 201, 202, 203, 204 to switch modulation capacitors C1, C2, C3, C4, respectively, in or out of circuit 200. To perform resistive modulation, controller 122 can control a switch 211 to switch a modulation resistor R1 in or out of circuit 200, and can control a switch 212, via an overvoltage protection circuit 210, to switch a modulation resistor R2 in or out of circuit 200. Switching one or more of the components C1, C2, C3, C4, R1, R2, can change an impedance of circuit 200 and/or receiver 120. The changes in impedance can cause receiver 120 to generate ASK signals that encode messages using different amplitudes. Switches 201, 202, 203, 204, 211, 212 can be FETs.

If receiver 120 is operating under capacitive modulation mode, one or more of switches 201, 202, 203, 204 can be switched on and switches 211, 212 can be switched off. If receiver 120 is operating under resistive modulation mode, one or more of switches 212, 212 can be switched on and switches 201, 202, 203, 204 can be switched off. If receiver 120 is operating under an overlap mode, where both capacitive and resistive modulations are being performed, then one or more of switches 201, 202, 203, 204, 212, 212 can be switched on.

In one embodiment, controller 122 can be configured to detect a failure condition associated with receiver 120. For example, controller 122 can detect a potential demodulation failure by transmitter 110 (see FIG. 1). In response to the detection of the failure condition, controller 122 can switch modulation mode by controlling switches 201, 202, 203, 204, 211, 212. If receiver 120 is operating under capacitive modulation mode, controller 122 detects the failure condition, controller 122 can switch to operate receiver 120 under one of 1) resistive modulation mode and 2) overlap mode.

To switch from capacitive modulation mode to resistive modulation mode, controller 122 can switch off switches 201, 202, 203, 204 and switch on one or more of switches 211, 212 to change a modulation mode of receiver 120 from capacitive modulation more to resistive modulation mode. To switch from capacitive modulation mode to overlap mode, controller 122 can switch on one or more of switches 211, 212 while maintaining operations of switches 201, 202, 203, 204 change the modulation mode of receiver 120 from capacitive modulation more to overlap mode. To switch from resistive modulation mode to capacitive modulation mode, controller 122 can switch off switches 211, 212 and switch on one or more of switches 201, 202, 203, 204 to change the modulation mode of receiver 120 from resistive modulation more to capacitive modulation mode.

FIG. 3A and FIG. 3B are diagrams showing example sequences 300, 310, respectively, that can implement alternating capacitive and resistive modulation for wireless power transfer. In an example, a firmware being executed by controller 122 of receiver 120 (see FIG. 1 and FIG. 2) can be programmed or configured to trigger the switch between different modulation modes. The firmware can be further programmed or configured to determine a number of cycles to perform the first modulation mode and/or the second modulation mode. Sequence 300 shown in FIG. 3A corresponds to an embodiment where the first modulation mode is capacitive modulation mode (e.g., depicted as CAP in FIG. 3A) and the second modulation mode is resistive modulation mode (e.g., depicted as RES in FIG. 3A).

Sequence 300 can span from a packet 301 to a packet 308. Each packet shown in FIG. 3A can have a duration of T. The packets shown in FIG. 3A can be data packets among communication packets 136 being transmitted from receiver 120 to transmitter 110 in FIG. 1. Further, the packets shown in FIG. 3A can be ASK signals generated by receiver 120 using capacitive modulation and/or resistive modulation. In one embodiment, as shown in FIG. 3A, receiver 120 can perform capacitive modulation to generate the first three packets 301, 302, 303. If transmitter 110 does not respond to packets 301, 302, 303, then controller 122 can detect that there is a failure condition (e.g., transmitter 110 being nonresponsive for a predefined amount of time, such as 3T). In response to the detection of the failure detection, controller 122 can switch operation of receiver 120 from capacitive modulation mode to resistive modulation mode. In response to the switch to resistive modulation mode, receiver 120 can generate a next packet, such as packet 304, using resistive modulation. Sequence 300 can continue with receiver 120 performing capacitive modulation to generate packets 305, 306, 307, then switch to resistive modulation for generating packet 308.

In one embodiment, controller 122 can be configured to determine a specific time to switch from the second modulation mode back to the first modulation mode, and/or a duration of operation under the second modulation mode. For example, a power loss threshold can be predefined in the firmware being executed by controller 122. If an amount of power loss (of system 100) incurred by the second modulation mode (e.g., resistive modulation) on two packets (e.g., two consecutive resistive modulations) is more than the power loss threshold, then controller 122 can operate receiver 120 to generate one packet using the second modulation mode then switch back to the first modulation mode. If the amount of power loss incurred by the second modulation mode on two packets is less than the power loss threshold, then controller 122 can operate receiver 120 to generate more than one packets, such as two packets, using the second modulation mode then switch back to the first modulation mode. In one embodiment, controller 122 can continue to operate receiver 120 to generate packets using the second modulation mode until controller 122 detects the power loss is less than the power loss threshold. In one embodiment, controller 122 can predetermine the number of packets to be generated using the second modulation mode, but continue to monitor power loss of system 100 and switch back to the first modulation mode, before the predetermined number of packets are generated using the second modulation mode, if the power loss is more than the power loss threshold. Hence, the pattern to switch between the first modulation mode and the second modulation mode can be relatively flexible, and can be dependent on various performance parameters of receiver 120.

In one embodiment, controller 122 can monitor a packet timeout and determine a modulation ratio based on the packet timeout. The modulation ratio can be a ratio of packets generated by capacitive modulation to packets generated by resistive modulation. In the examples shown in FIG. 3A and FIG. 3B, the modulation ratio is 3:1. In an example, controller 122 can perform a switch to the second modulation mode before a lapse of the packet timeout to attempt maintaining a connection between receiver 120 and transmitter 110 (e.g., transmitter 110 may disconnect and stop transferring AC power in response to lapse of packet timeout). In the example shown in FIG. 3A, if the packets are CEPs and a CEP timeout is 3.5T, then receiver 120 performing resistive modulation to generate packet 304 may prevent disconnection between receiver 120 and transmitter 110. However, if the CEP timeout is 2.5T, then receiver 120 may need to perform a resistive modulation to generate packet 303 (instead of performing capacitive modulation) to prevent disconnection between receiver 120 and transmitter 110, resulting in a modulation ratio of 2:1. Thus, the modulation ratio can vary with the packet timeout (e.g., modulation ratio increases with increasing packet timeout).

Sequence 310 shown in FIG. 3B corresponds to an embodiment where the first modulation mode is capacitive modulation mode (e.g., depicted as CAP in FIG. 3B) and the second modulation mode is overlap mode (e.g., depicted as packet having both CAP and RES in FIG. 3B). Sequence 310 can span from a packet 311 to a packet 318. Each packet shown in FIG. 3B can have a duration of T. In the example shown in FIG. 3B, receiver 120 can perform capacitive modulation to generate the first three packets 311, 312, 313. If transmitter 110 does not respond to packets 311, 312, 313, then controller 122 can detect that there is a failure condition (e.g., transmitter 110 being nonresponsive for a predefined amount of time, such as 3T). In response to the detection of the failure detection, controller 122 can switch operation of receiver 120 from capacitive modulation mode to overlap mode. In response to the switch to overlap mode, receiver 120 can generate a next packet, such as packet 314, using both capacitive and resistive modulations. Sequence 310 can continue with receiver 120 performing capacitive modulation to generate packets 315, 316, 317, then switch to overlap mode for generating packet 308 using both capacitive and resistive modulations.

By configuring controller 122 of receiver 120 to switch between capacitive modulation, resistive modulation, and a combination of capacitive and resistive modulation, receiver 120 can generate communication packets under different modulation schemes to improve a quality of the communication packet. The improve quality can be, for example, a relatively clearer distinction between amplitude differences in ASK signals. The improved quality can increase a chance of successful and current demodulation by transmitter 110. Further, the option to switch between capacitive modulation and resistive modulation under different conditions allows system 100 to function based on different optimization objectives. For example, if an objective is to preserve power, then controller 122 of receiver 120 may decrease a number of packets being generated by resistive modulation. If an objective is to optimize signal quality, then controller 122 of receiver 120 may increase the number of packets being generated by resistive modulation. Furthermore, by configuring controller 122 of receiver 120 to detect failure conditions, transmitter 110 may not need to be reconfigured, and components and configurations of transmitter 110 can remain unchanged.

FIG. 4 is a flow diagram illustrating a process 400 of implementing alternating capacitive and resistive modulation for wireless power transfer in one embodiment. The process 400 may include one or more operations, actions, or functions as illustrated by one or more of blocks 402, 404, 406 and/or 408. Although illustrated as discrete blocks, various blocks can be divided into additional blocks, combined into fewer blocks, eliminated, or performed in parallel, and/or performed in different order, depending on the desired implementation.

Process 400 can be performed by a power device. Process 400 may begin at block 402. At block 402, a controller can communicate with the power device by the first modulation mode. In one embodiment, the power device can be a wireless power receiver.

Process 400 can proceed from block 402 to block 404. At block 404, the controller can detect a failure condition between the controller and the power device. In one embodiment, the power device can be a wireless power transmitter and the controller can be a part of a wireless power receiver configured to receive a power from the wireless power transmitter. The detection of the failure condition can include detecting a failure at the wireless power transmitter to demodulate the signals being outputted by the wireless power receiver. In one embodiment, the failure condition can be based on at least one of an output current, frequency shift, and deadtime.

In one embodiment, the power device can be a wireless power receiver connected to a wireless power transmitter. The signals being outputted by the power device can include a CEP indicating a requested power level of AC power being received by the wireless power receiver. The detection of the failure condition can include detecting a power level of the AC power being received by the wireless power receiver is inconsistent with the requested power level.

Process 400 can proceed from block 404 to block 406. At block 406, the controller can, in response to the detection of the failure condition, can communicate with the power device by a second modulation mode. In one embodiment, the first modulation mode can include capacitive modulation and the second modulation mode can include resistive modulation. In one embodiment, the first modulation mode can include capacitive modulation and the second modulation mode can include capacitive modulation and resistive modulation, and a ratio of the capacitive modulation to the resistive modulation can be variable.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
    a controller configured to:
        communicate with a power device by a first modulation mode;
        detect a failure condition between the controller and the power device; and
        in response to the detection of the failure condition;
            communicate with the power device by a second modulation mode;
            determine a number of cycles to communicate with the power device by the second modulation mode; and
            return to communicate with the power device by the first modulation mode after a lapse of the determined number of cycles,
        wherein the first modulation mode comprises capacitive modulation, and the second modulation mode comprises resistive modulation.

2. The apparatus of claim 1, wherein the power device is a wireless power transmitter and the controller is a part of a wireless power receiver.

3. The apparatus of claim 1, wherein the second modulation mode further comprises capacitive modulation, and a ratio of the capacitive modulation to the resistive modulation is variable.

4. The apparatus of claim 1, wherein the controller is configured to:
    send a packet to the power device, and
    detect the failure condition in response to an absence of a response from the power device.

5. The apparatus of claim 1, wherein the failure condition is based on a change in at least one of:
    an output current;
    frequency shift;
    deadtime;
    rectifier voltage; and
    rectifier power.

6. A device comprising:
    a resonant circuit;
    a rectifier circuit coupled to the resonant circuit;
    a controller coupled to the resonant circuit and the rectifier circuit, the controller being configured to:
        communicate with a power device by a first modulation mode;
        detect a failure condition between the controller and the power device; and in response to the detection of the failure condition;
            communicate with the power device by a second modulation mode;
            determine a number of cycles to communicate with the power device by the second modulation mode; and
            return to communicate with the power device by the first modulation mode after a lapse of the determined number of cycles,
        wherein, the first modulation mode comprises capacitive modulation, and the second modulation mode comprises resistive modulation.

7. The device of claim 6, wherein the power device is a wireless power transmitter and the device is a wireless power receiver configured to receive power from the wireless power transmitter.

8. The device of claim 7, wherein:
    the failure condition indicates a failure at the wireless power transmitter to demodulate the signals being outputted from the resonant circuit.

9. The device of claim 6, wherein the second modulation mode further comprises capacitive modulation, and a ratio of the capacitive modulation to the resistive modulation is variable.

10. The device of claim 6, wherein the controller further configured to:
    send a packet to the power device, and
    detect the failure condition in response to an absence of a response from the power device.

11. The device of claim 6, wherein the failure condition based on at least one of:
    an output current;
    frequency shift; and
    deadtime.

12. A method for operating an apparatus, the method comprising:
    communicating, by a controller, with a power device by a first modulation mode;
    detecting, by the controller, a failure condition between the controller and the power device; and
    in response to the detection of the failure condition;
        communicating with the power device by a second modulation mode;
        determining a number of cycles to communicate with the power device by the second modulation mode; and
        returning to communicate with the power device by the first modulation mode after a lapse of the determined number of cycles,
    wherein the first modulation mode comprises capacitive modulation, and the second modulation mode comprises resistive modulation.

13. The method of claim 12, wherein the power device is a wireless power transmitter and the apparatus is a wireless power receiver configured to receive a power from the wireless power transmitter.

14. The method of claim 13, wherein:
    detecting the failure condition comprises detecting a failure at the wireless power transmitter to demodulate the signals being outputted by the wireless power receiver.

15. The method of claim 12, wherein the second modulation mode further comprises capacitive modulation, and a ratio of the capacitive modulation to the resistive modulation is variable.

16. The method of claim 12, further comprising:
sending, by the controller, a packet to the power device, and
detecting, by the controller, the failure condition in response to an absence of a response from the power device.

17. The method of claim 12, wherein the failure condition is based on at least one of:
an output current;
frequency shift; and
deadtime.

18. The apparatus of claim 1, wherein communicate with the power device by the first modulation mode comprises using the first modulation mode to encode a message in an amplitude shift key (ASK) signal, wherein the message specifies power transfer information.

19. The apparatus of claim 18, wherein the ASK signal is a first ASK signal, and communicate with the power device by the second modulation mode comprises at least one of:
using the second modulation mode to encode the message in a second ASK signal; and
using the second modulation mode to encode another message in a third ASK signal, wherein said another message specifies another power transfer information.

20. The apparatus of claim 18, wherein the power transfer information comprises at least one of:
an amount of power to be transferred by the power device;
a command to adjust a power level of power being transferred by the power device;
a command to maintain the power level of power being transferred by the power device; and
a command to stop a power transfer by the power device.

* * * * *